UNITED STATES PATENT OFFICE.

HARRY W. SMITH, OF WEST CHESTER, PENNSYLVANIA.

CRAYON COMPOSITION.

1,131,432.          Specification of Letters Patent.      Patented Mar. 9, 1915.

No Drawing.      Application filed April 16, 1912. Serial No. 691,191.

*To all whom it may concern:*

Be it known that I, HARRY W. SMITH, a citizen of the United States, residing at West Chester, in the county of Chester and State of Pennsylvania, have invented certain new and useful Improvements in Crayon Compositions, of which the following is a specification.

My invention relates to improvements in crayon compositions, the object of the invention being to provide a crayon which will be substantially dustless, and which will give the maximum of efficiency.

With these and other objects in view the invention consists in certain novel combinations of ingredients arranged in novel relative proportion and in an improved manner, as will be more fully hereinafter described and pointed out in the claim.

My improved crayon composition consists of clay and chalk mixed with a binder, acetic acid, and soap, and while of course the proportions may be varied in accordance with the style and cost of crayon desired, I find the following proportions to be efficacious: "Clay seventy-five pounds, and chalk seventy-five pounds, mixed with a binder consisting of water, four gallons; starch thirty ounces, impregnated with two ounces of acetic acid and mixed with twelve ounces of soap."

In carrying out the method, the clay and the chalk are thoroughly mixed in a suitable mixer, and then the binder which consists of water and starch, together with the acetic acid and soap is poured into the mixer and the mass is agitated so as to bring the composition to a putty-like consistency. This composition is then ready for molding or shaping, so that when it is dried, a crayon will be formed which is substantially dustless, and to which, of course, in the process of making, any suitable coloring matter may be added or the crayon will be white if no coloring matter is added, so that it may be used for ordinary blackboard work.

Having thus described my invention, what I claim as new and desire to secure by Letters Patent is:

The herein described crayon composition consisting of seventy-five pounds of clay and seventy-five pounds of chalk mixed together, and to which is added a binder consisting of thirty ounces of starch, two ounces of acetic acid, and twelve ounces of soap, mixed with substantially four gallons of water, substantially as described.

In testimony whereof I have signed my name to this specification in the presence of two subscribing witnesses.

HARRY W. SMITH.

Witnesses:
    ARTHUR T. PAINE,
    EDITH H. RUSSELL.